(12) United States Patent
Suzuki et al.

(10) Patent No.: US 10,967,348 B2
(45) Date of Patent: Apr. 6, 2021

(54) HEAT TREATMENT APPARATUS FOR CARBONACEOUS GRAINS AND METHOD THEREFOR

(71) Applicant: NIPPON ELECTRODE CO., LTD., Shizuoka (JP)

(72) Inventors: Hironaga Suzuki, Shizuoka (JP); Yuichi Kaba, Shizuoka (JP); Shinjiro Toda, Shizuoka (JP)

(73) Assignee: NIPPON ELECTRODE CO., LTD., Shizuoka (JP)

( * ) Notice: Subject to any disclaimer, the term of this patent is extended or adjusted under 35 U.S.C. 154(b) by 382 days.

(21) Appl. No.: 15/736,300

(22) PCT Filed: May 10, 2016

(86) PCT No.: PCT/JP2016/063899
§ 371 (c)(1),
(2) Date: Dec. 14, 2017

(87) PCT Pub. No.: WO2016/203873
PCT Pub. Date: Dec. 22, 2016

(65) Prior Publication Data
US 2018/0185805 A1    Jul. 5, 2018

(30) Foreign Application Priority Data

Jun. 15, 2015   (JP) .............................. JP2015-120264

(51) Int. Cl.
*H05B 3/60* (2006.01)
*B01J 6/00* (2006.01)
(Continued)

(52) U.S. Cl.
CPC ................ *B01J 6/00* (2013.01); *C01B 32/05* (2017.08); *C01B 32/205* (2017.08);
(Continued)

(58) Field of Classification Search
CPC .. B01J 6/00; B01J 6/001; C01B 19/00; C01B 32/05; C01B 32/20; C01B 32/205;
(Continued)

(56) References Cited

U.S. PATENT DOCUMENTS 2,303,973 A * 12/1942 Armstrong ............... C21Q 5/52
373/82
4,025,610 A    5/1977 Suzuki et al.
(Continued)

FOREIGN PATENT DOCUMENTS

EP      0010218     4/1980
JP      46-003470   11/1971
(Continued)

OTHER PUBLICATIONS

"Office Action of China Counterpart Application," with machine English translation thereof, dated Nov. 26, 2019, p. 1-p. 18.
(Continued)

*Primary Examiner* — Hung D Nguyen
(74) *Attorney, Agent, or Firm* — JCIPRNET

(57) ABSTRACT

Provided are a heat treatment apparatus for carbonaceous grains and a method therefor allowing drifts and internal clogging in a direct energizing furnace to not occur, allowing heat treatment of the carbonaceous grains to be continued uniformly at high temperatures for a prolonged period of time, and allowing productivity and workability to be improved. A conductive tubular structure 14 is electrically connected to an upper part of a lower electrode 13 in a manner of surrounding an upper electrode 12. The rate of change between the specific electrical resistivity of grains when grains are lightly filled and the specific electrical resistivity of grains when the grains are tap filled is defined (1-tap filling/lightly filling)×100, and the rate of change is equal to less than 70%.

6 Claims, 2 Drawing Sheets

(51) Int. Cl.
*C01B 32/05* (2017.01)
*F27B 1/08* (2006.01)
*F27B 1/00* (2006.01)
*F27D 11/04* (2006.01)
*C01B 32/205* (2017.01)
*C01B 32/921* (2017.01)
*C10B 19/00* (2006.01)

(52) U.S. Cl.
CPC ............ *C01B 32/921* (2017.08); *C10B 19/00* (2013.01); *F27B 1/005* (2013.01); *F27B 1/08* (2013.01); *F27D 11/04* (2013.01); *Y02P 20/10* (2015.11)

(58) Field of Classification Search
CPC ....... C01B 32/366; C01B 32/39; C01B 32/90; C01B 32/914; C01B 32/921; F27B 1/005; F27B 1/08; F27D 11/04; Y02P 20/124
USPC ........ 373/109, 111, 117, 118, 120, 122, 128, 373/79, 82
See application file for complete search history.

(56) References Cited

U.S. PATENT DOCUMENTS

| | | | |
|---|---|---|---|
| 4,261,857 A * | 4/1981 | Nakao | B01J 20/3441 373/120 |
| 4,288,407 A | 9/1981 | Markel et al. | |
| 4,601,887 A | 7/1986 | Dorn et al. | |
| 4,655,968 A * | 4/1987 | Queiser | G21F 9/32 373/120 |
| 4,760,585 A * | 7/1988 | Queiser | G21F 9/32 373/122 |
| 2005/0063893 A1* | 3/2005 | Ayala | B82Y 30/00 423/449.1 |
| 2011/0194583 A1 | 8/2011 | Li | |

FOREIGN PATENT DOCUMENTS

| | | |
|---|---|---|
| JP | S5090601 | 7/1975 |
| JP | S58135700 | 9/1983 |
| JP | H08135938 | 5/1996 |
| JP | 2002167208 | 6/2002 |

OTHER PUBLICATIONS

"International Search Report (Form PCT/ISA/210) of PCT/JP2016/063899", dated Jun. 21, 2016, with English translation thereof, pp. 1-4.

"Office Action of India Counterpart Application," dated May 1, 2019, p. 1-p. 6.

"Search Report of Europe Counterpart Application", dated Dec. 5, 2018, p. 1-p. 6.

* cited by examiner

HEAT TREATMENT APPARATUS FOR CARBONACEOUS GRAINS AND METHOD THEREFOR

CROSS-REFERENCE TO RELATED APPLICATION

This application is a 371 application of the international PCT application Ser. No. PCT/JP2016/063899, filed on May 10, 2016, which claims the priority benefit of Japan application No. 2015-120264, filed on Jun. 15, 2015. The entirety of each of the above-mentioned patent applications is hereby incorporated by reference herein and made a part of this specification.

TECHNICAL FIELD

The present invention relates to a heat treatment apparatus for carbonaceous grains and a method therefor, in which heat treatment of carbonaceous grains is performed continuously and uniformly at a high temperature by directly energizing the carbonaceous grains.

BACKGROUND ART

Physical characteristics of carbonaceous grains such as anthracite, petroleum coke, carbonaceous granulated bodies, and mixed granulated bodies of metal oxides and carbon significantly change depending on a heating treatment temperature. Therefore, when carbonaceous grains are used as raw materials for an electrode, raw materials for a carbonaceous refractories, electronic materials, battery materials, or the like, uniform heating treatment is required. In addition, even when a mixture of metal oxides and carbon is subjected to reduction through heat treatment and various types of metal carbides are obtained, uniform heat treatment is indispensable for reliably achieving intended reaction.

In the related art, a method, in which carbonaceous grains such as anthracite are fed into a vertical electric furnace and are directly energized so that the carbonaceous grains are continuously subjected to heating treatment at a temperature ranging approximately from 1,500° C. to 2,000° C., is widely used as an electrical roasting technology. In addition, Patent Literature 1 discloses a method of uniformly performing continuous graphitization at approximately 3,000° C.

CITATION LIST

Patent Literatures

Patent Document 1: JP No. 2002-167208 A

SUMMARY OF INVENTION

Technical Problem

However, the related art has had the following problems. That is, apparatuses performing continuous heating treatment by a vertical electric furnace used for electrical roasting have a problem of poor heat efficiency. Additionally, in the related art, since dispersion of the treatment temperature is significant, it is difficult to obtain heat-treated collected objects having uniform characteristics. At present, there is a tendency of requiring high-level characteristics and quality, and it is urgent to enhance the uniformity of heat treatment for carbonaceous grains.

In addition, electrical resistivity of carbonaceous grains is likely to vary in accordance with a change in their filling rate or the like. In a technology of continuously performing heating treatment by directly energizing carbonaceous grains, a change in the electrical resistivity affects a path of a current. As a result, there is a possibility that a phenomenon in which a current flows locally in a furnace body filled with carbonaceous grains, that is, a drift will occur.

When a drift occurs in a direct-energizing furnace, not only heating treatment of carbonaceous grains cannot be uniformly performed, but also there are cases that the temperature of the location where the drift occurs becomes extremely high. If an extremely high temperature portion is generated locally as described above, sublimation of carbon occurs in carbonaceous grains in a furnace. As a result, local consumption of an electrode is caused, sublimated gas is cooled and condensed, and a so-called bridge portion is generated, thereby leading to internal clogging. If clogging of carbonaceous grains occurs in a furnace, it is difficult to proceed with a continuous operation, and the productivity deteriorates.

The present invention has been made in order to solve the problems and an object thereof is to provide a heat treatment apparatus for carbonaceous grains and a method therefor, in which heat treatment of carbonaceous grains can proceed uniformly at a high temperature for a long period of time without causing a drift or internal clogging in a direct-energizing furnace and the productivity and the workability are improved.

Solution to Problem

In order to achieve the object described above, according to the present invention, there is provided a heat treatment apparatus for carbonaceous grains, performing heat treatment by directly energizing carbonaceous grains fed into a furnace body. The heat treatment apparatus has the following configuration elements (1) and (2).

(1) A columnar upper electrode and a tubular lower electrode are disposed above and below along a central axis of the furnace body.

(2) A conductive tubular structure is electrically connected to an upper end of the lower electrode in a manner of surrounding the upper electrode.

In addition, according to the present invention, a rate of change between electrical resistivity of grains at a time of light filling in which filling is performed only by an own weight of the carbonaceous grains and electrical resistivity of grains at a time of applying a predetermined load after tap filling of the carbonaceous grains may be set to equal to or less than 70%. Moreover, the present invention may further include a gas injection portion that injects gas into the furnace body. Furthermore, according to another aspect of the present invention, there is provided a heat treatment method for carbonaceous grains, using the heat treatment apparatus.

Advantageous Effects of Invention

In the present invention, the conductive tubular structure is electrically connected to the upper end of the lower electrode, and the tubular structure surrounds the upper electrode. Therefore, during energization, a current flows between the upper electrode and the lower electrode and between the upper electrode and the tubular structure via carbonaceous grains filling the inside of the furnace, and the carbonaceous grains themselves are led to resistant heat generation, so that a heating zone heated uniformly at a high temperature can be formed in the vicinity of an upper end portion of the lower electrode. Accordingly, uniform heat treatment of the carbonaceous grains can proceed stably for a long period of time, and the productivity and the workability are remarkably improved.

DESCRIPTION OF EMBODIMENTS (1) First Embodiment

[Configuration]

Figure 1:
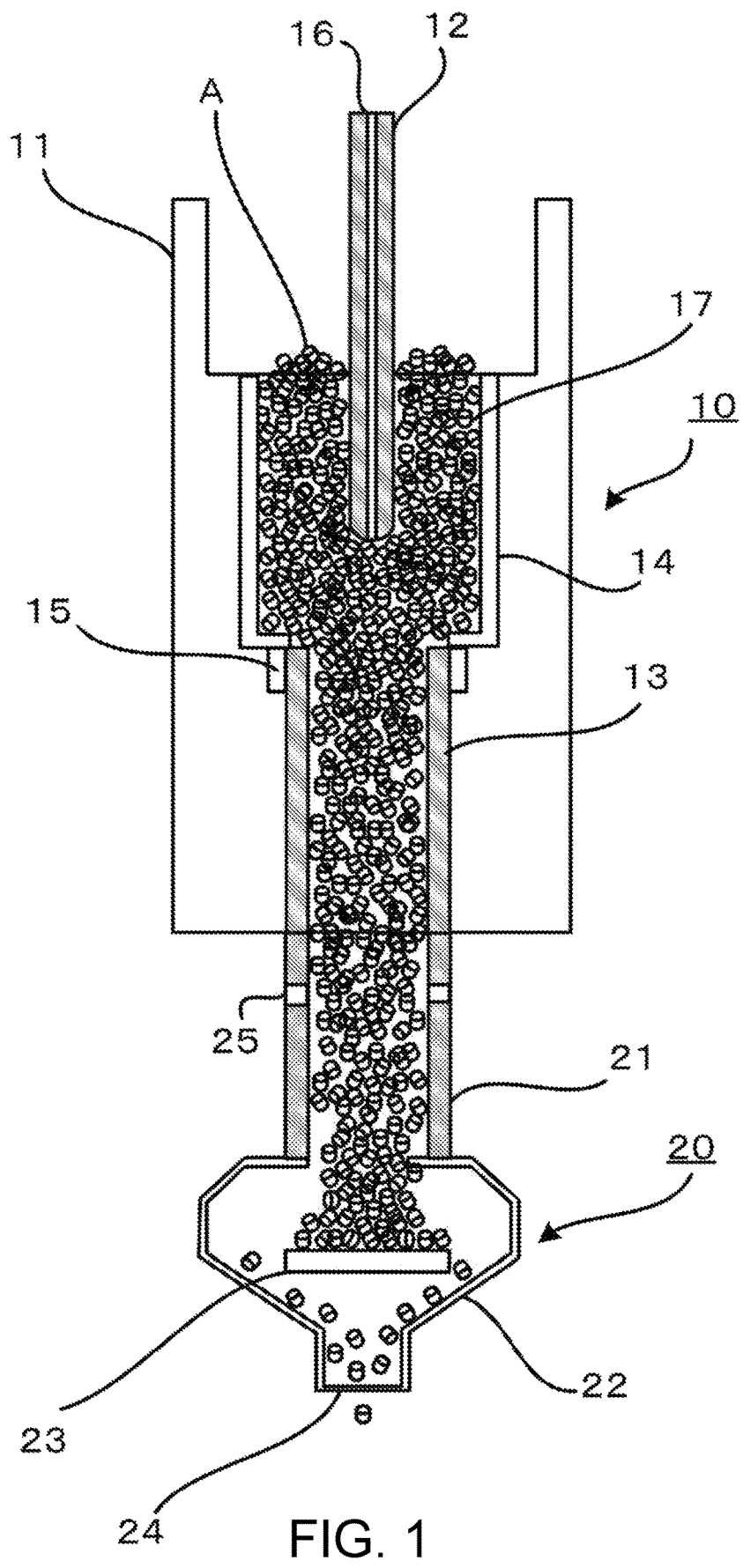
FIG. 1 is a configuration diagram of a first embodiment.
Figure 2:
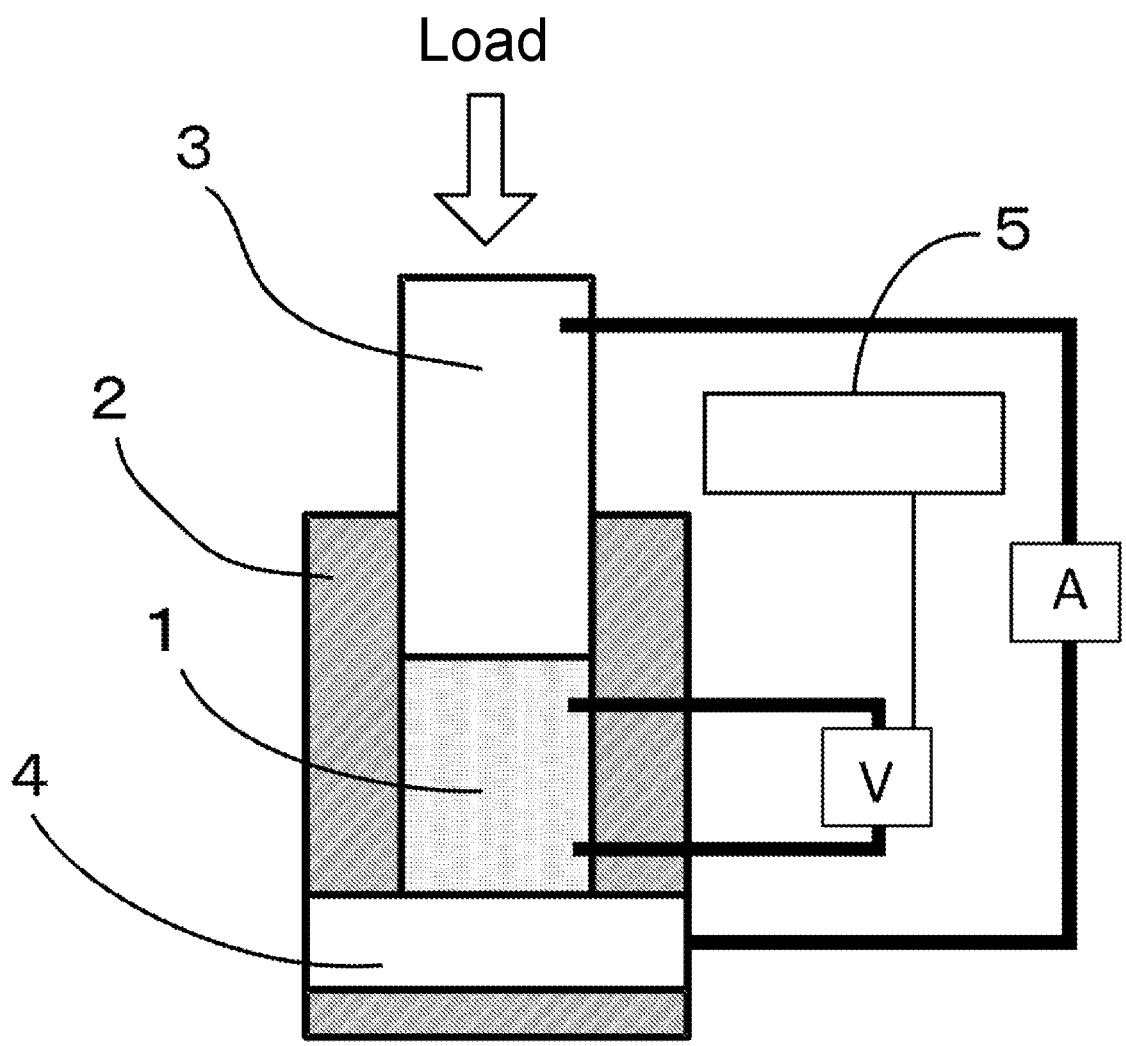
FIG. 2 is a configuration diagram of a measuring device used in the first embodiment.

Hereinafter, a heat treatment apparatus for carbonaceous grains according to a first embodiment of the present invention will be described in detail with reference to FIGS. 1 and 2. As illustrated in FIG. 1, the present embodiment is a heat treatment apparatus for carbonaceous grains, in which carbonaceous grains A are fed into a furnace body 11 that is a vertical electric furnace, and the carbonaceous grains A gradually descend inside the furnace body 11 while being directly energized, thereby continuously performing heat treatment of the carbonaceous grains A. In this heat treatment apparatus, a heat treatment unit 10 including the furnace body 11 is provided on its upper side, and a cooling unit 20 for cooling the heat-treated carbonaceous grains A is attached to its lower side.

The furnace body 11 is constituted of a cylindrical furnace shell lined with a refractories, and a columnar upper electrode 12 is disposed at a location on its central axis. A gas injection hole 16 is formed in the upper electrode 12 in a manner of penetrating the upper electrode 12 in a longitudinal direction that is vertical direction in FIG. 1. In addition, a feed port 17 for the carbonaceous grains A is formed in an upper portion of the furnace body 11.

On the central axis in the furnace body 11, a lower electrode 13 is disposed to face the upper electrode 12 with a predetermined distance. The lower electrode 13 has a cylindrical shape such that the entered carbonaceous grains A from an opening of an upper portion descend the inside at a speed corresponding to a discharge amount, and the carbonaceous grains A are discharged through an opening of a lower portion.

A conductive tubular structure 14 is disposed above the lower electrode 13 so as to surround the upper electrode 12. In the tubular structure 14, the carbonaceous grains A fed through the feed port 17 is filled. The carbonaceous grains A in the tubular structure 14 enter the tubular structure 14 through an opening of an upper portion, descend the inside at a speed corresponding to the discharge amount, and flow into the lower electrode 13 through an opening of a lower portion. The tubular structure 14 is electrically connected to an upper end portion of the lower electrode 13 by a support ring 15. Therefore, when the upper electrode 12 and the lower electrode 13 are energized, a heating zone is formed from an upper end portion of the tubular structure 14 to the opening of the upper portion of the lower electrode 13. In addition, an inner diameter of the tubular structure 14 is set to be larger than an inner diameter of the lower electrode 13.

The cooling unit 20 is provided with a cylindrical water-cooling jacket 21 and a hood portion 22 which is attached integrally therewith. Below the water-cooling jacket 21, that is, inside the hood portion 22, a water-cooling plate 23 is installed close to a lower end portion of the lower electrode 13. In the hood portion 22, the upper side has a disk shape and the lower side has a funnel shape, and a discharge portion 24 with a small diameter is provided in the lower portion.

An unillustrated pipe in which cooling water flows is disposed inside the water-cooling jacket 21 and the water-cooling plate 23. The water-cooling plate 23 receives the carbonaceous grains A which have passed through the water-cooling jacket 21. An unillustrated rotary vane is installed in the upper surface portion of the water-cooling plate 23. The discharge amount of the carbonaceous grains A through the discharge portion 24 is quantitatively managed by this rotary vane.

In addition to the gas injection hole 16 formed in the upper electrode 12, a gas injection hole 25 is provided in the vicinity of the upper end portion of the water-cooling jacket 21. In the present embodiment, inert gas such as argon gas and nitrogen gas is injected into the lower electrode 13 and the tubular structure 14 through these gas injection holes 16 and 25.

Incidentally, in regard to the carbonaceous grains A which are discharged through the discharge portion 24 of the cooling unit 20 and collected after heat treatment, that is, collected heat-treated products, the characteristics of the collected heat-treated products are evaluated based on true specific gravity, an ash content, electrical resistivity, an elemental analysis using fluorescent X-rays and an ICP analysis method, an analysis of graphite using an X-ray diffraction method, or the like, in accordance with the purpose thereof.

In the present embodiment, uniformity is evaluated as a characteristic of the collected heat-treated products. In this case, as a simple method of evaluating the uniformity of the collected heat-treated products, it is convenient to employ a method in which the collected heat-treated products are powdered and the electrical resistivity is measured. Since it is the electrical resistivity of the collected heat-treated products which are powdered, it will be referred to as powder resistance. The powder resistance significantly depends on the type or the granularity of a material, and a heat treatment temperature. Therefore, it is effective to obtain variation coefficients, standard deviation/average value×100, of the powder resistance of a plurality of collected heat-treated products which are arbitrarily gathered and evaluate the uniformity of the collected heat-treated products based on the obtained results.

[Method of Measuring Powder Resistance]

Here, using FIG. 2, a configuration of a measuring device measuring the powder resistance of the carbonaceous grains A will be described. A sample 1 obtained by crushing or cracking the carbonaceous grains A into powder is fed into an insulative cylinder 2 having an internal cross-sectional area S (mm$^2$). A push rod 3 is thrust from above, and a certain load is applied thereto. In the present embodiment, the load was set to 30 kgf/cm$^2$. In this state, a current I (A) flows between the push rod and a base plate 4, and a voltage E (V) between terminals H (m) for measuring a voltage therebetween is measured. A powder resistance r (Ωmm$^2$/m) is calculated according to the following Expression (1).

(Math. 1)

$$r = (E \times S)/(I \times H) \tag{1}$$

[Carbonaceous Grains]

In the present embodiment, Joule heat is generated when the carbonaceous grains A are directly energized, and heating treatment is performed. As the carbonaceous grains A, it is possible to use anthracite, calcined coal coke, calcined petroleum coke, artificial graphite, a mixture or a granulated body thereof, a mixed granulated body of metal oxides and carbon, or the like.

Conductivity of the carbonaceous grains A is evaluated by measuring the electrical resistivity. The electrical resistivity of the carbonaceous grains A, that is, resistance of grains will be referred to hereinafter as grain resistance. The above-described powder resistance is an index for evaluating the characteristics of the collected products after heat treatment. In contrast, the grain resistance is an index for evaluating the conductivity of the carbonaceous grains A in a stage before being fed into the heat treatment apparatus.

The grain resistance is significantly affected by not only the electrical resistivity of the carbonaceous particles themselves constituting the carbonaceous grains A but also contact resistance caused due to contact points among the particles. That is, the grain resistance of the carbonaceous grains A significantly varies due to an influence of the shape, the surface condition, the granularity distribution, and the filling rate of the carbonaceous grains A. Therefore, in the present embodiment, focusing on the difference between states of the carbonaceous grains A at the time of light filling and at the time of tap filling, a rate of change between the grain resistance of the carbonaceous grains A at the time of light filling and the grain resistance of the carbonaceous grains A at the time of tap filling is defined as equal to or less than 70%. The rate of change is obtained from (1-tap filling /light filling)×100.

The light filling indicates a state where the carbonaceous grains A are simply fed into an insulative container only by the own weight of the carbonaceous grains A. The state of the carbonaceous grains A at the time of light filling assumes an initial state where the carbonaceous grains A which are materials are fed into the tubular structure 14.

The tap filling indicates a state where the inside of the insulative container is filled with the carbonaceous grains A by vertically moving the entire measuring device until the filling density is saturated. In addition, in measuring the grain resistance at the time of tap filling, measurement is performed by applying a load corresponding to a load which is applied to the carbonaceous grains A in the tubular structure 14. In the present embodiment, the load was set to 0.1 kgf/cm². The state of the carbonaceous grains A at the time of tap filling assumes a state where the carbonaceous grains A which are materials descend in the tubular structure 14 and reach a central portion thereof.

It is desirable that the carbonaceous grains A have appropriate conductivity. However, even when the carbonaceous grains A have extremely poor conductivity, a current flows in the carbonaceous grains A via the tubular structure 14 during an energizing operation, unless the carbonaceous grains A are non-conductors. Therefore, heat treatment starts in the carbonaceous grains A due to resistant heat generation in a stage in which the carbonaceous grains A enter the tubular structure 14.

Incidentally, during the energizing operation of the present embodiment, the temperature in the vicinity of the opening of the upper portion of the tubular structure 14 is set to 1,000° C. Therefore, when the carbonaceous grains A have extremely poor conductivity, it is possible to evaluate the adequacy of feeding the carbonaceous grains A according to the present embodiment in advance by subjecting the material to heating treatment at 1,000° C., and the resistance of the material is measured thereafter. Specifically, the carbonaceous grains A are heat-treated at 1,000° C. in a reduction atmosphere of nitrogen gas or the like and are cooled down to room temperature. Thereafter, the grain resistance of the carbonaceous grains A is measured.

[Measurement of Grain Resistance]

The principle of measuring the grain resistance of the carbonaceous grains A is similar to that of the powder resistance described above. The carbonaceous grains A are put in an insulative receptacle having the cross-sectional area S (m²), a current flows in the carbonaceous grains A through a current terminal, and electrical resistivity r (Ω) between terminals installed with an interval L (m) is measured. The grain resistance R of the carbonaceous grains A (Ωm) is obtained according to the following Expression (2).

(Math. 2)

$$R = r \times S/L \quad (2)$$

[Operational Method]

In the present embodiment, it may be wasteful, in terms of time and power, to perform energizing and to raise the temperature after the inside of the furnace body 11 is filled with the carbonaceous grains A which is treatment target from the beginning. Therefore, it is preferable that the inside of the furnace body 11 is filled with a conductive material, for example, calcined petroleum coke ingot or the like ranging approximately from 10 mm to 20 mm in advance and then the upper electrode 12 and the lower electrode 13 are energized, so that the temperature in the vicinity of the opening of the upper portion of the tubular structure 14 is raised to approximately 1,000° C.

In such a state, the carbonaceous grains A which are fed into the furnace body 11 in the earliest stage are fed in a preheated state where the temperature is raised to approximately 1,000° C. In addition, carbonaceous grains A which are newly fed into the tubular structure 14 in succession thereafter are preheated by transferred heat or radiant heat from the existing carbonaceous grains A. Due to the preheating thereof, all the carbonaceous grains A which have been fed into the furnace body 11 can exhibit more favorable conductivity. Therefore, the carbonaceous grains A proceed to be efficiently energized, and thus heat treatment can be continuously performed.

EXAMPLES

In order to explain the operation and the effect of the present embodiment, Examples which have the features of the present embodiment and Comparative Examples which are not included in the present embodiment are summarized in Table 1. The variation coefficients of the powder resistance were acquired by arbitrarily gathering ten samples from heat-treated collected objects which had been obtained. As described above, the powder resistance is an index for evaluating the characteristics of the collected heat-treated products.

TABLE 1

| | Measurement of Grain Resistance | | | | Continuous heat treatment | | Collected articles |
|---|---|---|---|---|---|---|---|
| | Treatment at 1,000° C. | Light filling (μΩm) | Tap filling (μΩm) | Rate of change (%) | Connection state of tubular structure | Heat treatment temperature | Variation coefficient of powder resistance |
| Example 1 | Absent | 17,982 | 7,888 | 56% | Connected | 2,100° C. | 4.2 |
| Example 2 | Absent | 169,267 | 55,913 | 67% | Connected | 3,000° C. | 2.8 |
| Example 3 | Present | 218,887 | 84,802 | 61% | Connected | 2,400° C. | 4.3 |
| Example 4 | Absent | 883,638 | 389,328 | 56% | Connected | 1,800° C. | 4.8 |
| Example 5 | Present | 4,855 | 2,474 | 49% | Connected | 2,300° C. | 4.5 |
| Comparative Example 1 | Absent | 17,982 | 7,888 | 56% | Not connected | 2,100° C. | 31.7 |
| Comparative Example 2 | Absent | 20,370 | 5,923 | 71% | Connected | 3,000° C. | 38.3 |
| Comparative Example 3 | Present | 218,479 | 61,231 | 72% | Connected | 2,400° C. | 16.2 |

Examples 1 and 2 and Comparative Examples 1 and 2

In Examples 1 and 2 and Comparative Example 2, the tubular structure 14 was electrically connected to the upper end of the lower electrode 13 by the support ring 15. Meanwhile, in Comparative Example 1, the support ring 15 was not provided, the tubular structure 14 was not connected to the lower electrode 13, and the tubular structure 14 was simply installed in the vicinity of the upper portion of the lower electrode 13. In Comparative Example 1, the heat treatment apparatus which was illustrated in FIG. 1 but was partially different was used. That is, a difference between Example 1 and Comparative Example 1 was only whether or not the tubular structure 14 was connected to the upper end of the lower electrode 13, and other conditions were the same.

In these Examples 1 and 2 and Comparative Examples 1 and 2, calcined petroleum coke having true specific gravity of 2.02, an ash content of 0.4%, and a volatile component of 0.6% was used as the carbonaceous grains A. While nitrogen gas of 30 to 100 liter/min was introduced into the heat treatment apparatus of the present embodiment illustrated in FIG. 1, continuous heat treatment was performed at a treatment speed of 100 kg per hour. In addition, the heat treatment temperatures in Examples 1 and 2 were respectively set to 2,100° C. and 3,000° C., and the heat treatment temperatures in Comparative Examples 1 and 2 were respectively set to 2,100° C. and 3,000° C.

The grain size of the carbonaceous grains A was set to range from 10 to 20 mm in Example 1 and Comparative Example 1, was set to range from 3 to 35 mm in Example 2, and was set to range from 0.3 to 30 mm in Comparative Example 2. A sieve analysis test was performed in accordance with JIS 8815, and the average grain size (d50) was measured. The average grain size (d50) was 14 mm in Example 1 and Comparative Example 1, was 20 mm in Example 2, and was 12.5 mm in Comparative Example 2.

In addition, in Examples 1 and 2, the rate of change in electrical resistivity of the grain resistance of the carbonaceous grains A was equal to or less than 70%. That is, the rates of change in grain resistance in Examples 1 and 2 were 56% and 67% respectively. Meanwhile, in Comparative Example 2, the rate of change in electrical resistivity of the grain resistance of the carbonaceous grains A was 71%.

As shown in Table 1, the variation coefficients of the powder resistance in Examples 1 and 2 were 1.8 and 4.2 respectively, that is, both were equal to or less than 5. Therefore, in Examples 1 and 2, a stable operation could be performed, and it was confirmed that uniform heat treatment was also performed on the obtained heat-treated objects. Meanwhile, in Comparative Examples 1 and 2, the variation coefficients of the powder resistance were 31.7 and 38.3 respectively, indicating that desired heat treatment could not be uniformly performed. In addition, in Comparative Examples 1 and 2, a stable operation could not be performed due to clogging in the furnace body 11. Moreover, in Comparative Example 2, when the furnace body 11 was observed after the operation, noticeable consumption assumed to be caused due to a drift was recognized in the upper electrode 12.

Example 3 and Comparative Example 3

In Example 3, calcined petroleum coke similar to that in Example 1 was crushed into powder of 75 μm or less in total, using a ball mill. As binders, 6% of cornstarch flour and 2% of polyvinyl alcohol were newly added to this powder, and the mixture was kneaded by a two-arm kneader. Thereafter, the mixture was granulated using a disk pelleter, and then a granulated body having a diameter of 10 mm and a length of 15 mm was obtained.

The granulated body was dried at 170° C. using an electric dryer, and a carbonaceous granulated body A was obtained. This was counted as Example 3. When the carbonaceous grains A are not properly, for example, handled during a production process, partial damage is caused and chips are generated. Therefore, carbonaceous grains A having chips generated therein were prepared as Comparative Example 3. The average grain size (d50) was 9 mm in Example 3 and was 6 mm in Comparative Example 3. Using these carbonaceous grains A, continuous heat treatment was performed at 2,400° C. similar to that in Example 1.

Incidentally, since the carbonaceous grains A in Example 3 and Comparative Example 3 had poor conductivity, special heat treatment was required when the grain resistance was measured. Approximately 30 kg each of the carbonaceous grains A for measuring grain resistance were gathered, were put in iron containers, and were heat-treated at 1,000° C. in an electric furnace under a nitrogen gas atmosphere. After the carbonaceous grains A were cooled down to room temperature, the grain resistance of the carbonaceous grains A was measured. As a result, the rate of change in grain resistance in Example 3 was 61%. Meanwhile, the rate of change in grain resistance of the carbonaceous grains A in Comparative Example 3 was 72%. The carbonaceous grains A heat-treated at 1,000° C. for measuring grain resistance were not used in continuous heat treatment.

As a result, in Example 3, a stable operation could be performed, and the variation coefficient of the powder resistance of the collected heat-treated products which had been obtained was 4.3 and was uniform. Meanwhile, in Comparative Example 3, a stable operation could not be performed due to clogging in the furnace body 11. The variation coefficient of the powder resistance was 16.2 and the obtained heat-treated objects were not uniform.

Example 4

In Example 4, anthracite having true specific gravity of 1.42, an ash content of 5%, a volatile component of 5.5%, and a grain size ranging from 6 to 18 mm was used as the carbonaceous grains A. Continuous heat treatment was performed at a treatment speed of 200 kg per hour by the heat treatment apparatus of the present embodiment illustrated in FIG. 1. In Example 4, a stable operation could be performed, the variation coefficient of the powder resistance was 4.8, and the obtained heat-treated objects were also uniform.

Example 5

In Example 5, artificial graphite having true specific gravity of 2.2 and titanium oxides having true specific gravity of 4.2 were mixed together at 65% and 35%, respectively, and the mixture was crushed into powder of 7 μm using a vibratory ball mill. As a binder, 20% of liquid phenolic resin KC1300 (produced by GUNEI Chemical Industry Co., Ltd.) was newly added to this powder, and the mixture was kneaded by a two-arm kneader. Thereafter, the mixture was granulated using a disk pelleter, and then a granulated body having a diameter of 15 mm and a length of 15 mm was obtained.

The granulated body was heat-treated at 500° C. using a baking furnace, and carbonaceous grains A were obtained. Continuous heat treatment was performed at a treatment speed of 100 kg per hour by the heat treatment apparatus illustrated in FIG. 1 using the carbonaceous grains A. As a result, reaction of $TiO_2+3C \rightarrow TiC+2CO$ progressed during the heat treatment process, and it was possible to continuously obtain titanium carbides. The degree of generating titanium carbides was stable, and the variation coefficient of the powder resistance was also 4.5.

[Operation and Effect]

The operation and the effect of the first embodiment are as follows.

(1) In the present embodiment, the inside of the furnace body 11 is filled with the carbonaceous grains A fed through the upper portion of the furnace body 11, and the carbonaceous grains A in the furnace body 11 are directly energized by the upper electrode 12 and the lower electrode 13. Therefore, the carbonaceous grains A themselves are led to resistant heat generation, and heating treatment is performed. When the electrodes 12 and 13 are energized, a current flows between the upper electrode 12 and the lower electrode 13 via the carbonaceous grains A. Since the conductive tubular structure 14 is electrically connected to the upper end of the lower electrode 13, a current also flows therein.

That is, a current also flows between the upper electrode 12 and the tubular structure 14 via the carbonaceous grains A. As a result, heat treatment can be performed gradually and thoroughly by resistant heat generation during the process in which the carbonaceous grains A descend in the tubular structure 14. Therefore, it is possible to obtain heat-treated collected objects having uniform characteristics, and it is possible to meet the demands for high-level characteristics and quality.

In addition, since the carbonaceous grains A are heat-treated thoroughly, gradually, and uniformly, a rapid temperature rise is suppressed and no drift occurs in the tubular structure 14 filled with the carbonaceous grains A. Therefore, there is no local consumption of an electrode caused due to sublimation of carbon, and there is no bridge portion resulting from sublimated gas which has been cooled and condensed, so that there is no clogging in the furnace body 11. Accordingly, the carbonaceous grains A smoothly flow from the tubular structure 14 toward the lower electrode 13, so that a stably continuous operation can proceed for a long period of time, and excellent productivity can be achieved.

(2) In the present embodiment, the heating zone is formed from the upper end of the tubular structure 14 to the opening of the upper portion of the lower electrode 13. The inner diameter of the tubular structure 14 is set to be sufficiently larger than the inner diameter of the lower electrode 13. Therefore, it is possible to widen a region in the vicinity of the upper end of the lower electrode 13 to which the tubular structure 14 is connected, and it is possible to realize a large heating zone in a uniform state at a high temperature.

Therefore, all the carbonaceous grains A which have descended at a speed corresponding to the discharging speed are inevitably heat-treated via the large heating zone in a uniform state at a high temperature, so that the ultimate treatment temperature for the carbonaceous grains A can be stabilized. Besides, since the present embodiment employs the direct-energizing type, it is easy to retain a set desired temperature by controlling a current, and the temperature accuracy is extremely favorable. Therefore, the ultimate treatment temperature for the carbonaceous grains A can be precisely controlled.

(3) During the process in which the carbonaceous grains A descend in the tubular structure 14 from the upper portion to the lower portion, a difference may occur in the filling rate of the carbonaceous grains A in the horizontal direction, depending on the circumstances of the descent thereof. However, in the present embodiment, the rate of change between grain resistance at the time of light filling of the carbonaceous grains A and grain resistance at the time of tap filling of the carbonaceous grains A is set to equal to or less than 70%. Therefore, occurrence of a drift can be suppressed, and uniform heating treatment is performed and internal clogging can be reliably prevented. Therefore, the present embodiment can contribute to realizing a continuous operation of uniform heating treatment performed efficiently with high productivity for a long period of time.

(4) Moreover, in the present embodiment, the gas injection hole 16 is formed in the upper electrode 12. In addition, the gas injection hole 25 is also provided in the vicinity of the upper end portion of the water-cooling jacket 21. Accordingly, inert gas such as argon gas can be injected into the lower electrode 13 and the tubular structure 14 through these gas injection holes 16 and 25. In this case, the gas injected into the lower electrode 13 and the tubular structure 14 flows such that the gas ascends inside the lower electrode 13 and the tubular structure 14 in a direction opposite to the descent of the carbonaceous grains A.

Therefore, due to the gas injected through the gas injection holes 16 and 25, gas volatilized from the carbonaceous grains A in accordance with heat treatment can be effectively discharged from the lower portion toward the upper portion of the lower electrode 13 and the tubular structure 14. As a result, a continuous operation of the heat treatment apparatus can proceed for a long period of time, and the productivity is further improved.

(5) The cooling unit 20 for cooling the carbonaceous grains A is provided on the lower side of the lower electrode 13. Therefore, the carbonaceous grains A can be promptly cooled, and the heat-treated carbonaceous grains A can be efficiently collected. Accordingly, the productivity of the collected heat-treated products can be further enhanced.

[Other Embodiments]

The above-described embodiment is presented as an example in this specification, and the present invention is not limited to the above-described embodiment. For example, the upper electrode may have a prism shape instead of the columnar shape. Although the shape of the tip of the upper electrode is not limited, it is preferably a hemispheric shape or a conical shape. The lower electrode may have a square tube shape instead of the cylindrical shape. Any of a carbonaceous material and graphite can be used for these electrodes. However, it is preferable to employ artificial graphite electrodes.

In addition, the shape, the material, and the like of the tubular structure can also be suitably changed. For example, an inclination portion may be provided in the inner wall portion of the tubular structure such that carbonaceous grains slide toward the lower electrode. The inclination portion may be uniformly provided from the upper end surface to the lower end surface in the tubular structure or may be provided from an approximately middle part of the tubular structure to the lower end surface. According to such an embodiment, carbonaceous grains can smoothly descend from the tubular structure to the lower electrode, so that high-quality heat treatment of carbonaceous grains can be executed.

It is possible to suitably select the ratio of the maximum inner diameter of the tubular structure and the inner diameter of the lower electrode, or the ratio of the maximum inner diameter of the tubular structure and the outer diameter of the upper electrode, as long as the ratio is within a range in which carbonaceous grains smoothly flow from the tubular structure to the lower electrode. The distance between the upper electrode and the lower electrode can also be suitably changed as long as the consumption of an electrode is minimized and the distance is within the range in which carbonaceous grains smoothly flow from the tubular structure to the lower electrode. In addition, the shape, the configuration, and the like of the support ring connecting the tubular structure to the lower electrode may be suitably changed in accordance with the tubular structure or the lower electrode. Furthermore, the gas injection portion injecting gas into the lower electrode or the tubular structure may be provided in the tubular structure or the furnace body itself.

The compounding method and the kneading method, and the like using a binder when powder is granulated into carbonaceous grains are arbitrary. For example, a two-arm batch-type kneader can be used. The type of a binder can be suitably selected, and any material may be used as long as it exhibits bonding properties during carbonization, such as starchy flour, pitch, solid resin, coal tar, and liquid resin. Moreover, multiple types of materials in a combination may be used. For example, as the starchy flour, it is possible to use wheat starch, rice starch, bean starch, and potato starch. In addition, starchy flour obtained by pregelatinizing thereof can be used as a binder. Furthermore, the granulation method is also arbitrary. For example, it is possible to use a granulator such as a disk pelleter.

REFERENCE SIGNS LIST

1 Sample
2 Cylinder
3 Push rod
4 Base plate
5 Electric resistance measuring instrument
10 Heat treatment unit
11 Furnace body
12 Upper electrode
13 Lower electrode
14 Tubular structure
15 Support ring
16, 25 Gas injection hole
17 Feed port
20 Cooling unit
21 Water-cooling jacket
22 Hood portion
23 Water-cooling plate
24 Discharge portion
A Carbonaceous grain

The invention claimed is:

1. A heat treatment method for carbonaceous grains, using a heat treatment apparatus comprising:
    a furnace body, comprising a cylindrical furnace shell lined with refractory:
    a columnar upper electrode and a tubular lower electrode that are disposed, in the furnace body, above and below along a central axis of the furnace body; and
    a conductive tubular structure in the furnace body, being electrically connected to an upper end of the lower electrode in a manner of surrounding the upper electrode,
    wherein the tubular lower electrode is disposed to face the columnar upper electrode with a predetermined distance in a vertical direction,
    the heat treatment method comprising step of setting, to be equal to or less than 70%, a rate of change between electrical resistivity of grains at a time of light filling in which filling is performed only by an own weight of the carbonaceous grains and electrical resistivity of grains at a time of applying a predetermined load after tap filling of the carbonaceous grains, the rate of change being defined as (1-tap filling/light filling)×100.

2. The heat treatment method for carbonaceous grains according to claim 1, wherein the heat treatment apparatus further comprises:
    a gas injection portion that injects gas into the furnace body.

3. The heat treatment method for carbonaceous grains according to claim 2, wherein the gas injection portion comprises a gas injection hole formed in the upper electrode in a manner of penetrating the upper electrode.

4. The heat treatment method for carbonaceous grains according to claim 2, wherein the gas injection portion comprises a gas injection hole provided in vicinity of an upper end portion of a water cooling jacket attached to a lower side of the furnace body.

5. The heat treatment method for carbonaceous grains according to claim 1, wherein a heating zone is formed from an upper end portion of the conductive tubular structure to the upper end of the tubular lower electrode when the columnar upper electrode and the tubular lower electrode are energized.

6. The heat treatment method for carbonaceous grains according to claim 1, wherein an inner diameter of the conductive tubular structure is larger than an inner diameter of the tubular lower electrode.

\* \* \* \* \*